United States Patent
Gellerich et al.

(10) Patent No.: US 9,218,038 B2
(45) Date of Patent: Dec. 22, 2015

(54) DETERMINING AND OPTIMIZING ENERGY CONSUMPTION OF COMPUTER SYSTEMS

(75) Inventors: Wolfgang Gellerich, Boeblingen (DE); Holger Smolinski, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 13/424,845

(22) Filed: Mar. 20, 2012

(65) Prior Publication Data

US 2012/0185710 A1 Jul. 19, 2012

Related U.S. Application Data

(63) Continuation of application No. 12/944,854, filed on Nov. 12, 2010, now abandoned.

(30) Foreign Application Priority Data

Dec. 16, 2009 (EP) ..................................... 09179388

(51) Int. Cl.
  *G06F 1/32* (2006.01)
  *G06F 1/26* (2006.01)
  *G06F 1/18* (2006.01)

(52) U.S. Cl.
  CPC ............... *G06F 1/3203* (2013.01); *G06F 1/189* (2013.01); *G06F 1/26* (2013.01); *G06F 1/32* (2013.01)

(58) Field of Classification Search
  CPC ............... G06F 1/189; G06F 1/26; G06F 1/32
  USPC ........................................................ 713/320
  See application file for complete search history.

(56) References Cited

U.S. PATENT DOCUMENTS

| | | | |
|---|---|---|---|
| 5,726,901 A | 3/1998 | Brown | |
| 5,881,233 A | 3/1999 | Toyoda et al. | |
| 6,205,555 B1 | 3/2001 | Kageshima et al. | |
| 6,367,023 B2 | 4/2002 | Kling et al. | |
| 7,134,029 B2 * | 11/2006 | Hepner et al. | 713/300 |
| 7,278,136 B2 | 10/2007 | Moritz et al. | |
| 7,337,334 B2 | 2/2008 | Kuhlmann et al. | |

(Continued)

FOREIGN PATENT DOCUMENTS

| | | |
|---|---|---|
| EP | 1325402 | 11/2006 |
| WO | 2004006078 | 1/2004 |

OTHER PUBLICATIONS

Wai-Kai Chen, The VLSI handbook, 2006, CRC Press, 2nd edition, ch 15.*

(Continued)

*Primary Examiner* — Jaweed A Abbaszadeh
*Assistant Examiner* — Austin Hicks
(74) *Attorney, Agent, or Firm* — Lieberman & Brandsdorfer, LLC

(57) ABSTRACT

Management of energy consumption within a computing environment. Energy consumption of different hardware components are measured in the computing environment. Measurement includes voltage and current versus time used by the hardware components. The different measured values of energy consumption are collected, followed by tracking the hardware component used in time during an execution of an individual execution context within the computing environment. The energy consumption of the individual execution context is calculated by associating the corresponding collected measured energy consumption to the hardware component used.

16 Claims, 2 Drawing Sheets

(56) References Cited

U.S. PATENT DOCUMENTS

| | | |
|---|---|---|
| 7,363,464 B2 | 4/2008 | Liron et al. |
| 7,373,269 B2 | 5/2008 | Furuichi et al. |
| 7,472,293 B2 | 12/2008 | Kuhlmann et al. |
| 7,536,573 B2 | 5/2009 | Schumacher et al. |
| 2003/0154347 A1 | 8/2003 | Ma et al. |
| 2004/0128564 A1 | 7/2004 | Dubinsky |
| 2006/0129852 A1 | 6/2006 | Bonola et al. |
| 2008/0229127 A1 | 9/2008 | Felter et al. |
| 2009/0049313 A1 | 2/2009 | Gooding et al. |
| 2009/0070611 A1 | 3/2009 | Bower, III et al. |
| 2009/0150893 A1* | 6/2009 | Johnson et al. ............... 718/104 |

OTHER PUBLICATIONS

In File Cache Performance and Tuning, (http://technet.microsoft.com/en-us/library/bb742613.aspx).*

Mazidi & Mazidi, 2003, The 80×86 IBM PC and Compatible Computers (vols. I & II) Assembly Language, Design, and Interfacing, Prentice Hall, 4th edition vols. I & II, p. 380.*

Snowdon et al., Power Measurement as the Basis for Power Management, Australia.

* cited by examiner

DETERMINING AND OPTIMIZING ENERGY CONSUMPTION OF COMPUTER SYSTEMS

CROSS REFERENCE TO RELATED APPLICATION(S)

This application is a continuation patent application claiming the benefit of the filing date of U.S. patent application Ser. No. 12/944,854 filed on Nov. 12, 2010 and titled "Method and System to Determine and Optimize Energy Consumption of Computer Systems", which is hereby incorporated by reference.

FIELD OF THE INVENTION

The invention relates to a method and a system to determine and optimize energy consumption of computer systems.

BACKGROUND

Energy consumption of business processes has become an important economical factor during the last couple of years. This is also true for the operation of computing centers. An ongoing dynamic information technology infrastructure comprising virtual resources, software as a service, and other components allows reassigning resources dynamically to different consumers. Within such environments, economical processes such as billing have a need to measure, control, and account any type of costs on a fine granular basis to be able to clearly define the corresponding costs of each consumer.

Previous strategies to minimize energy consumption within computer centers focused on technical systems having a reduced overall energy consumption e.g. via improved solid-state technology or variable clock rates, and on re-using heat that was previously wasted.

For example, U.S. Pat. No. 6,367,023 to Kling et al. describes a system including a power supply, a meter coupled to the power supply measuring e.g. current or voltage between the power supply and some parts of the computer system, and a controller. Measurements from the meter are used by the controller to determine if the power consumed by that part of the computer system reaches a threshold to send in case a throttle signal.

Similarly, a power management system is disclosed in U.S. Patent Publication No. 2004/0128564 to Dubinsky enabling granular management of power consuming accessories like a microprocessor, a disk drive, an I/O port and/or a chip within an individual compute component. Accordingly, the power management system allows for several states of operation of an individual component within a multiple compute component system allowing to operation of the individual components between several states.

The prior art provides one or more coarse solutions to address energy consumption. Accordingly, there is a need for a solution that provides granular management with respect to energy consumption in a computing environment.

BRIEF SUMMARY

The invention comprises a method for providing an improved method for determining and optimizing energy consumption of computer systems.

In one aspect of the invention, a method is provided for managing energy consumption with a computing environment. Energy consumption of different hardware components in the environment is measured. More specifically, for each of the hardware components voltage and current versus time usages are measured. Values of the measured energy consumption by the hardware components is collected, followed by tracking the usage of the hardware in time during execution of an individual context within the computing environment. The energy consumption of the individual context is calculated by associated corresponding collected measured energy consumption to the used hardware component.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

Figure 1:
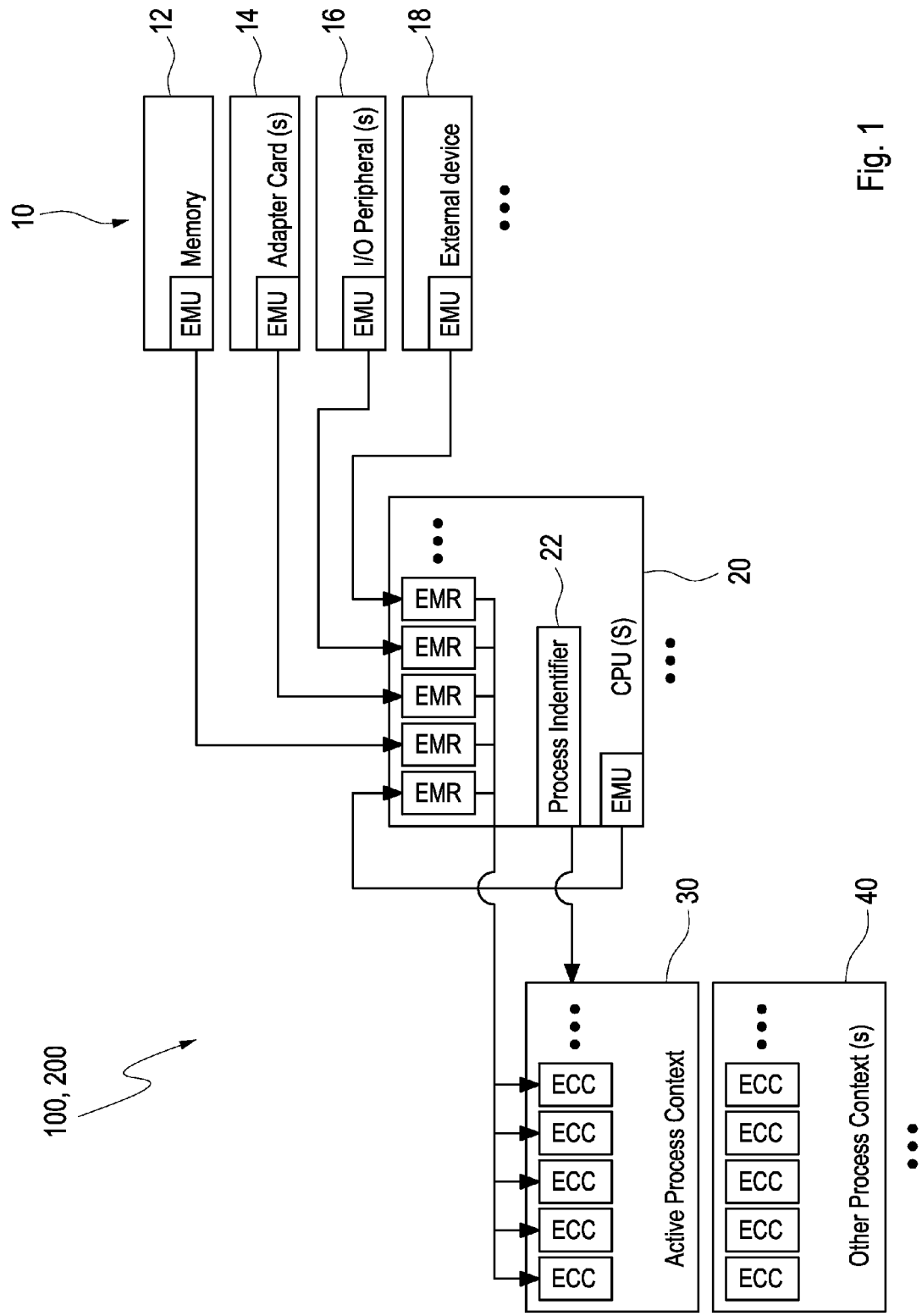
FIG. 1 is block diagram of an example embodiment of a computing environment comprising multiple hardware components according to an embodiment of this invention, and is suggested for printing on the first page of the issued patent.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labelled as managers. A manager may be implemented in programmable hardware devices such as field programmable gate arrays, programmable array logic, programmable logic devices, or the like. The manager may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Energy is the power consumption integrated over time. In contrast to the systems known in prior art, it is proposed to measure energy consumption of an individual hardware component according to individual execution contexts. This is obtained by measuring voltage and current versus time of those hardware components such to be able to account energy consumption to individual execution contexts and/or to individual applications executed on the computer system and/or to users running jobs on the computing environment. The measured energy consumption in any part of the computing environment or in any device attached to the computing environment can be provided on request. In other words, the implementation of the present invention allows a per-process energy accounting support integrated into components like a microprocessor. Besides allowing allocation of energy consumption to individual hardware components, the energy consumption of the whole computing environment can be managed comprising optimization, billing, and other management tasks.

The invention supports optimization of energy consumption of the internal processes the computing environment runs to perform its services. Energy consumption is measured and accounted to individual hardware components of a computing environment. This data can be used subsequently to optimize the energy consumption of individual services or processes. Load balancing and capacity planning can be additionally based on energy consumption data. The computing environment such as a computer center can plan power consumption peaks to optimize power plant fees. In addition to CPU time and storage consumption, the computing environment can account energy consumption of tasks and users, and bill users for the energy needed for performing their required tasks.

Advantageously it is possible to monitor hardware components with respect to their energy consumption. Actual power consumption can be compared with a standard value. A deviation from the standard value beyond a specified size, e.g. a certain percentage of the standard value, indicates that a problem may have occurred. For instance, an increased energy consumption of a hard disc drive may indicate mechanical problems of the hard disc drive which accordingly may be replaced early enough before a failure of the hard disc drive.

In one embodiment, the measured energy consumption can be associated with an identification of the analyzed hardware components. It is also possible to associate the measured energy consumption with a group of hardware components, as desired. Similarly, in one embodiment, the method may comprise comparing the calculated energy consumption of the individual execution context with a predefined criterion for the individual execution context. Particularly, the predefined criterion can be associated with a budget and/or a quota for the individual execution context. An individual execution context can be an operating system process, a group of operating system processes, a virtual CPU or any other manageable execution entity in a computer system. By way of example, it is possible to adapt the processing of execution contexts according to the calculated energy consumption and delay or accelerate the start of an execution context.

In one embodiment, a priority for execution of a process performed by the hardware component in the computing environment can be assigned according to the calculated energy consumption. By distributing energy consumption in time load peaks can be avoided. It is not necessary to hold available huge components such as cooling capacity for such load peaks. Processes on energy intensive hardware can be shifted to periods with advantageous price for electric energy.

Execution of a process performed by the hardware component may be suspended when the associated calculated energy consumption exceeds a predefined energy budget. Undesired load peaks in the computing environment can be avoided.

The energy consumption may be measured by energy measurement units associated with individual hardware components in the computing environment and may output on request a value of consumed energy collected in a defined time period. Particularly, values of energy consumption of one or more individual hardware components and/or one or more groups of hardware components can be entered in a set of energy measurement registers held by a processing unit of the computing environment. Expediently, each hardware in the computing environment or connected to the computing environment may be equipped with such an energy measurement unit.

The set of registers may be initialized to a minimum value, incremented by a value delivered by a value of energy consumption provided by an energy measuring unit, wherein the set of registers is initialized after any execution context switch by the values corresponding to a current execution context, and updated periodically. Particularly, the set of registers can be incremented by the values provided by one energy measurement unit or a set of energy measurement units and wherein the corresponding energy measurement units are reset. Each register of the set of registers can be initialized, particularly initialized to a value including 0, and incremented by values delivered by an energy measurement unit and the actual values read out. The registers can be initialized after an execution context has been changed, i.e. an operating system process has stopped and a new operating system process has started executing. The registers can be updated periodically, e.g. before any execution context switch and can be incremented by values from one or more energy measurement units, while the corresponding one or more energy measurement units are then reset.

One or more energy consumption counters of a current execution context can be updated by values read from the set of registers before performing a switch of an execution context. The one or more energy consumption counters can be used by the operating system and/or systems management software. For instance, the operating system can report total or individual energy consumption values to a user or systems management software. It may also adjust the execution priority of the processes according to a policy related to the contents of the one or more energy consumption counters. By way of example, a policy may be that processes which have special requirements in regard to energy consumption do not conflict with each other, or that processes which have exceeded their energy budget are suspended until excess energy is available or terminated.

A priority for execution of a process performed by the hardware component in the computing environment may be assigned according to the calculated energy consumption. Similarly, execution of a process performed by the hardware component may be suspended when the associated calculated energy consumption exceeds a predefined energy budget. Accordingly, calculated control of an energy consumption of the computing environment is made possible.

The system may comprise one or more energy measurement units for measuring the energy consumption, wherein the one or more energy measurement units are associated with individual hardware components in the computing environment. The one or more energy measurement units may output on request a value of consumed energy collected in a defined time period. Particularly, values of energy consumption of one or more individual hardware components and/or one or more groups of hardware components can be entered in a set of energy measurement registers held by a processing unit of the computing environment. Further, the set of registers may be initialized to a minimum value, incremented by a value delivered by a value of energy consumption provided by an energy measuring unit, wherein the set of registers is initialized after any execution context switch by the values corresponding to a current execution context, and updated periodically. Particularly, the set of registers can be incremented by the values provided by one energy measurement unit or a set of energy measurement units and wherein the corresponding energy measurement units are reset. Further, one or more energy consumption counters of a current execution context can be updated by values read from the set of registers before performing a switch of an execution context.

FIG. 1 depicts an example embodiment of a system for managing energy consumption within a computing environment (100). The computing environment (100) by way of example comprises one or more computers with a central processing unit (20) including a process identifier (22), with the process identifier (22) defining an execution context. The process identifier (22) is connected to an active process context (30) and may switch to another process context (40) after the active process context (30) has finished. In one embodiment, the process context is one form of an execution context. As already mentioned, an execution context may be best understood as an operating system process, a group of operating system processes, an operation system thread, an operation system virtual CPU executing virtual execution context or any other manageable execution entity in a computer system.

Multiple hardware components (10) are connected to the central processing unit (20), such as a memory (12), an adapter card (14), an I/O periphery (16), an external device (18) and the like. Hardware components (10) are components which consume electric energy in the computing environment (100).

Each hardware component (12), (14), (16), (18) includes an energy measuring unit EMU which measures the energy consumed by the particular hardware component (12), (14), (16), (18). The central processing unit (20) itself is also a hardware component and also includes an energy measuring unit EMU.

Coupled to the central processing unit (CPU) (20) are multiple energy measurement registers EMR, for instance one energy measurement registers, EMRs. In one embodiment, there is one EMR for each EMU. The EMRs contain values of consumed energy for each individual hardware component (12), (14), (16), (18), (20) or for one or more groups of hardware components (12), (14), (16), (18), (20). The EMR can be initialized to a value including 0, increased by an amount delivered by the EMU associated with the particular energy measurement register EMR, and read out by an appropriate machine instruction. The EMRs are initialized after any switch of the active process context (30) to a new process context (40) by values corresponding to the active execution context, e.g. when the active process context (30) is terminated and the process identifier (22) is connected to the next process context (40), and updated periodically, e.g. before any context switch is performed. Thus, the EMRs are incremented by the values provided by one EMU or a set of EMUs, while the corresponding EMUs are reset.

A set of energy consumption counters ECC count the consumed energy per process, and is coupled to each process context (30), (40). Before any switch between the active process context (30) to the new process context (40), the ECCs of the active process context (30) is updated by the values read from the EMRs. The ECCs are used by the operating system and/or systems management software. The operating system reports the total or individual energy consumption values to a user or systems management software. It will also adjust the execution priority of the processes according to a policy related to the contents of the one or more ECCs. By way of example, a policy may be that processes which have special requirements in regard to energy consumption do not conflict with each other, or that processes which have exceeded their energy budget are suspended until excess energy is available or terminated.

The disclosed system (200) contains one or more hardware extension in the form of EMUs to a computing environment (100) which measure the energy consumption of the total system, and/or of individual components, e.g. processor or disk array, and/or of units within a component, e.g. floating point unit within a processor, a particular disk within a disk array.

Measuring electrical energy requires measurement of time, electrical voltage, and electrical current. Time can be easily measured as almost all components of a computer system have a clock signal available. Voltage can also be easily determined in many cases as many components of a computer system are supplied with a constant voltage, usually even stabilized. In case voltage can vary, it is usually switched between well known constant values. For measuring the electrical current, several approaches are possible.

In some cases the hardware component (10) will have a separate power supply. State-of-the-art (switching) power supplies often measure output current anyway. For separate hardware components (10), the current can be measured by using a separate current sensor attached to a power line.

Current consumed by a microelectronic chip can be measured by a Hall sensor within the chip. The microelectronic chip can be a processor chip, a memory chip, an interface chip, a graphics processor chip, an analog-digital converter or the like. In one embodiment, a shunt resistor and an AD converter can be provided and the current is derived from a voltage drop across the shunt resistor. For units within the hardware component (10) and/or (20), e.g. a floating-point unit within a processor chip, the current can be measured by current sensors located on a processor chip. In case the hardware component (10) and/or (20) has a separate AC power supply, e.g. a disk unit, the current sensor can be implemented as an inductor coupling to the electrical current in the respective power lines.

The physical parameter to be determined is electrical energy. Whenever possible, the energy value can be made available by extending an already existing interface in the hardware component (10) by the EMU. In the case of peripheral components attached to the computing system (100), such as a printer or a disk array this may be an interface for requesting the component's status. Processors may provide an instruction to transmit and store an energy value into a register.

Such an interface may provide: a method for reporting an accumulated energy consumption since the hardware component (10) had power-on; a method to trigger resetting the energy consumption to a value of zero, particularly in an EMR, and a method of reporting the accumulated energy consumption since the last reset, particularly reporting the accumulated energy consumption to an ECC; the accumulated current or energy consumption since the interface was preset, i.e. set to a value other than zero, including the preset value of the interface.

Some hardware components (10) of a computing environment (100), such as a computer system, have the property that they are shared by different process contexts executed by an operating system of the computer system, and that the hardware component (10) is aware of the respective process context. One example is that many CPU models support process parallelism in that a certain register is used to identify a currently executing process. Such information is often used to also implement memory access protection. The present invention includes a method to accumulate and report energy consumption per process. An advantage is that user accounting can be supported. Another example is that a graphics processor may have an indication of the graphic window it is currently working on. In these cases, the hardware component (10) may perform an accounting of its energy consumption. This means that a CPU can tell the energy consumed so far for a certain process, and a graphics processor can tell how much energy is consumed when drawing a particular graphics window. Another example is that system memory may be used by all tasks, i.e. processes, running on the computer system. Attributing the energy consumed by memory is done by measuring the total energy consumption of the memory and then calculating what amount or the totally used memory belongs to a particular process. Network and I/O operations can be considered in a similar way.

The disclosed system (200) may also contain an interface component to make the data mentioned above available to components outside of the computing environment (100) or to display the gathered energy consumption data to a user. This interface can comprise one or more of a visual display of the energy consumption data, a visual display of a qualifying statement about the energy consumption data (e.g. an alarm), an audible display of energy consumption data, an audible display of a qualifying statement about the energy consumption data, e.g. an alarm, a network protocol to retrieve the energy consumption data, other mechanisms to retrieve the energy consumption data from the computing environment (100); and/or an interface between the operating system and a system management tool or the like for reporting the measured values of energy consumption. In addition, this interface component can be an integral component of the computing environment (100) or an external component which provides these services to the computing environment (100) and/or other systems.

Figure 2:
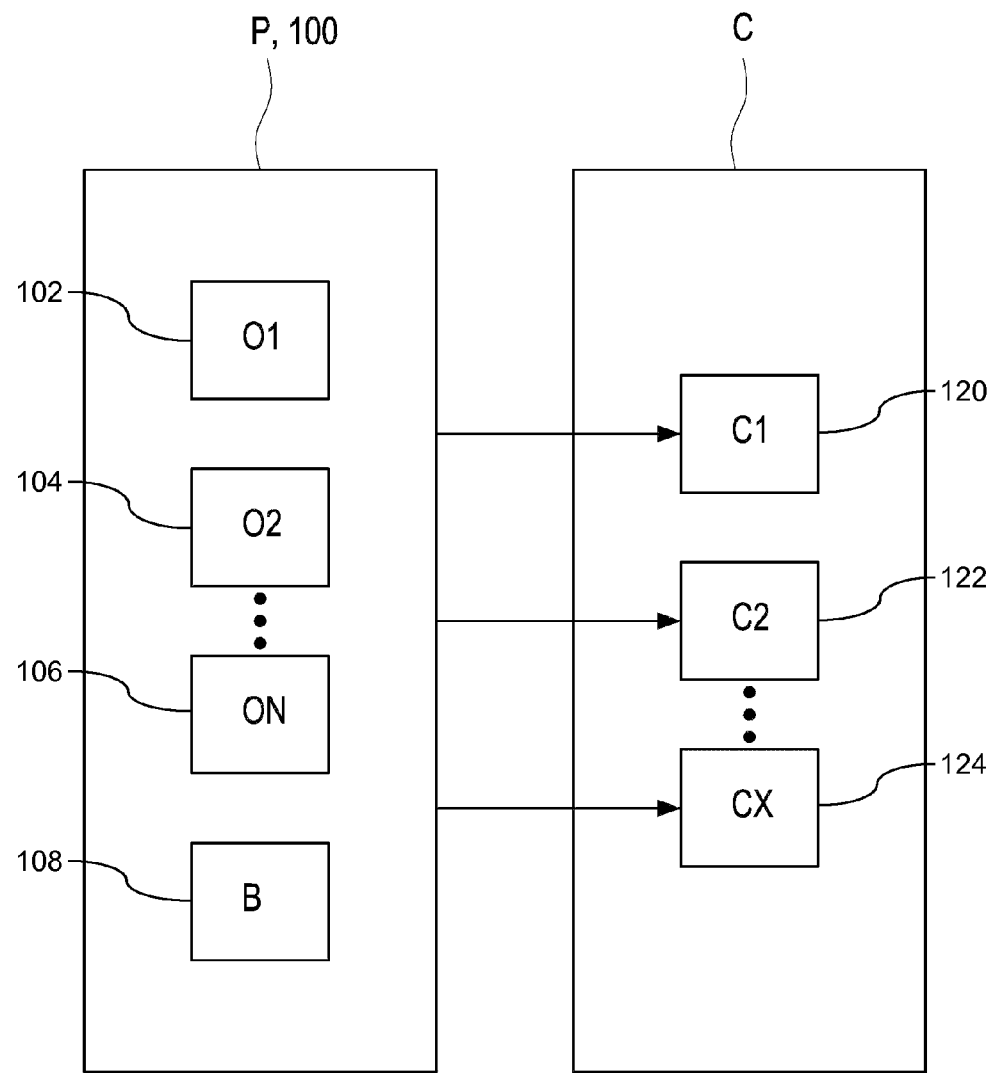
FIG. 2 is a block diagram of an example of a provider system including a computing environment coupled to customers.

The present invention may advantageously support management and billing associated with computing services as illustrated in FIG. 2. By way of example, the computing environment (100) may be a computer center of an information technology service provider, P, who sells a variety of computing services such as online transactions processing (102), (104), and (106) or application data backup (108) for a set of customers (120), (122), (124). These customers (120), (122), (124) require from provider P to offer each of these services for individual prices, which is only dependent on the amount of performed services, e.g. amount of data backed up, number of orders processed etc. Provider P needs to consider all cost factors into this price.

Provider P can bill users/customers not only for CPU time and storage consumption but also for energy consumption. At operating system level, a typical message would be "this process used 1.2 s CPU time and 0.92 Wh energy". At a larger level, provider P can tell how much energy it took to run, for instance, a systems application and product installation for one month.

Provider P learns about the energy consumption of certain tasks performed, such as data backup jobs. Provider P can use this knowledge to decide to do the backup at a time of the day when energy is cheap. Alternatively, provider P may use this information to decide how often full backups may be performed or how often a partial backup may be sufficient. Provider P can also use this information to bill customers (120), (122), (124) for their backups they requested. Customers can be billed according to the energy consumption associated with processes performed by or for them in the computing environment (100).

The computers in provider P's computing environment (100) can be utilized in a variable way. By way of example, a system performs process (102) at one time and might perform process (104) later. When processes (102) and (104) have different characteristics in regard of energy consumption, provider P can charge customers requiring process (102) other than customers requiring process (104).

Provider P may associate the actual work load performed by parts of the computing environment (100) with the energy consumption of those components. Load balancing may take into account to exploit consumed energy. Energy monitoring may show, for instance, that a disk array has continuously high energy consumption during a certain period of the day but handles only a few requests during that time. It can be decided to shut down parts of the disk array, or to schedule these few requests to a different time and turn off the disks completely for the said period. Accordingly, an optimization for "energy per request" is made possible.

The computer systems of provider P can be utilized in a more homogeneous way with respect to energy consumption. When one system is performing energy intense workload and another system performs less energy consuming workload, the power and cooling capacities will differ strongly. Accordingly, the tasks of the computer systems can be distributed more homogeneously with respect to energy consumption.

As energy costs usually vary depending on daytime, provider P can optimize energy costs when performing energy intense processes and operations at a time when energy is available at a low price.

Furthermore, power station providers may charge an extra fee for energy consumption above a certain level. By analyzing the energy consumption data, provider P can detect periods with peak energy consumption. Provider P can save cost by scheduling work load such that energy peaks are avoided.

Customers (120), (122), and (124) may be willing to spend a limited amount of money for letting services being performed. With the present invention provider P has a mechanism to schedule and/or prioritize these services in an optimized way, such that the cost of performing these services can be optimized.

Provider P receives detailed data on by which hardware components within a computing environment such as e.g. a computer system or within a computer center, during which period in time and caused by which tasks (processes) or customer electrical energy is consumed. Means are provided to combine these data with workload and/or capacity, planning, and monitoring tooling. Energy consumption can be used as an additional parameter for work load accounting, planning, and balancing as well as additional parameter for customer billing.

The invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read-only memory (CD-ROM), compact disk-read/write (CD-R/W) and DVD.

A preferred data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O-devices (including, but not limited to keyboards, displays, pointing devices, etc.) can be coupled to the system either directly of through intervening I/O controllers.

Network adapters may also be coupled to the system to enable the data processing system or remote printers or storage devices through intervening private or public networks. Modems, cable modem and Ethernet cards are just a few of the currently available types of network adapters.

The invention provides a computer program product comprising a computer useable medium including computer usable program code for managing energy consumption within a computing environment, and a data processing program for execution in a data processing system comprising software code portions for performing a method when said program is run on a computer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for managing energy consumption within a computing environment, the method comprising:

measuring energy consumption of different hardware components in the computing environment by measuring voltage and current versus time used by the hardware components;

collecting values of the measured energy consumption;

tracking hardware component used in time during an execution of an individual execution context within the computing environment;

calculating energy consumption of the individual execution context by associating the corresponding collected measured energy consumption to the hardware component used, providing a hardware utilization assessment based on the calculated energy consumption, and assigning a priority of execution of a process performed by the hardware component to the calculated energy consumption;

adapting processing of the individual execution context according to the calculated energy consumption, including distributing execution context between at least two tracked hardware components based on the hardware utilization assessment; and assessing at least one energy cost according to the calculated energy consumption associated with process performance within the computing environment.

2. The method of claim 1, wherein the measured energy consumption is associated with an identification of analyzed hardware components.

3. The method of claim 1, further comparing the calculated energy consumption of the individual execution context with a predefined criterion for the individual execution context, wherein the predefined criterion is associated with a budget and/or a quota for the individual execution context.

4. The method of claim 1, further comprising suspending execution of a process performed by the hardware component when the associated calculated energy consumption exceeds a predefined energy budget.

5. The method of claim 1, wherein the energy consumption is measured by an energy measurement unit (EMU) associated with individual hardware components in the computing environment and output on request a value of consumed energy collected in a defined time period.

6. The method of claim 5, further comprising entering values of energy consumption of one or more individual hardware components and one or more groups of hardware components in a set of energy measurement registers (EMR) held by a processing unit of the computing environment.

7. The method of claim 6, wherein entering values of energy consumption comprises:
    initializing the set of EMRs to a minimum value, wherein the set of EMRs is initialized after any execution context switch by the values corresponding to a current execution context, and is updated periodically;
    incrementing the EMRs by one or more values provided by one EMU or by a set of EMUs; and
    resetting the corresponding EMUs.

8. The method of claim 7, further comprising updating an energy consumption counter (ECC) of a current execution context by values read from the set of EMRs before an execution context switch.

9. The method of claim 1, further comprising suspending an execution of a process performed by the hardware component when the associated calculated energy consumption exceeds a predefined energy budget.

10. The method of claim 1, wherein the computing environment is a computer center of a service provider, and the assessed cost is applied to a computing service selected from the group consisting of: online transaction processing and application data backup.

11. A method for managing energy consumption within a computing environment, the method comprising:
    measuring energy consumption of different hardware components in the computing environment by measuring voltage and current versus time used by the hardware components, and entering values of energy consumption of one or more individual hardware components and one or more groups of hardware components in a set of energy measurement registers (EMR) held by a processing unit of the computing environment;
    collecting values of the measured energy consumption;
    tracking hardware component used in time during an execution of an individual execution context within the computing environment;
    calculating energy consumption of the individual execution context by associating the corresponding collected measured energy consumption to the hardware component used, providing a hardware utilization assessment based on the calculated energy consumption, and assigning a priority of execution of a process performed by the hardware component to the calculated energy consumption;
    adapting processing of the individual execution context according to the calculated energy consumption, including distributing execution context between at least two tracked hardware components based on the hardware utilization assessment; and
    assessing at least one energy cost according to the calculated energy consumption associated with process performance within the computing environment.

12. The method of claim 11, wherein the energy consumption is measured by an energy measurement unit (EMU) associated with individual hardware components in the computing environment and output on request a value of consumed energy collected in a defined time period.

13. The method of claim 12, wherein entering values of energy consumption comprises:
    initializing the set of EMRs to a minimum value, wherein the set of EMRs is initialized after any execution context switch by values corresponding to a current execution context, and is updated periodically; and
    incrementing the set of EMRs by the values provided by one EMU or by a set of EMUs.

14. The method of claim 13, further comprising resetting the corresponding EMUs.

15. The method of claim 14, further comprising updating an energy consumption counter (ECC) of a current execution context by values read from the set of EMRs before an execution context switch.

16. The method of claim 11, wherein the computing environment is a computer center of a service provider.

* * * * *